United States Patent [19]

Hanke

[11] 3,882,196

[45] May 6, 1975

[54] ODOR-FREE THERMOFORMED HEAT-DEGRADED POLYVINYL ALCOHOL

[75] Inventor: David E. Hanke, Neenah, Wis.

[73] Assignee: Kimberly-Clark Corporation, Neenah, Wis.

[22] Filed: Feb. 21, 1974

[21] Appl. No.: 444,482

Related U.S. Application Data

[63] Continuation of Ser. No. 292,543, Sept. 27, 1972.

[52] U.S. Cl. ............ 260/895; 128/263; 260/33.4 R; 260/42.51; 260/91.3 VA
[51] Int. Cl. ..................... C08f 29/26; C08f 29/30
[58] Field of Search .......... 260/91.3 VA, 895, 42.51

[56] References Cited
UNITED STATES PATENTS

| | | | |
|---|---|---|---|
| 3,105,058 | 9/1963 | Osugi et al. | 260/45.5 |
| 3,193,534 | 7/1965 | Matsubayashi et al. | 260/77.5 |
| 3,250,748 | 5/1966 | Suzumura et al. | 260/775 |

OTHER PUBLICATIONS

Grassie, N., "Thermal Degradation of Polyvinyl Acetate," Part 2, Trans. Faraday Soc., 49, No. 7, p. 836 (July, 1953).

*Primary Examiner*—Stanford M. Levin
*Attorney, Agent, or Firm*—Daniel J. Hanlon, Jr.; William D. Herrick; Raymond J. Miller

[57] ABSTRACT

Heat-degraded thermoformed water-soluble polyvinyl alcohol is rendered odor-free by mixing a proton acceptor with the polyvinyl alcohol before the polyvinyl alcohol is heatdegraded by a thermoforming operation.

4 Claims, No Drawings

ODOR-FREE THERMOFORMED HEAT-DEGRADED POLYVINYL ALCOHOL

This is a continuation, of application Ser. No. 292,543, filed Sept. 27, 1972, now abandoned.

BACKGROUND OF THE INVENTION

With the present public concern for preserving the environment, it has been found desirable to search for materials which, when disposed of after use, will physically or biologically decompose and therefore avoid cumulative despoilment of the environment. One logical candidate for such a material is water-soluble polyvinyl alcohol for use in disposable sanitary products, such as tubes for inserting products such as tampons or suppositories into body cavities, syringes, bedpans, pill boxes and the like. However, to produce such items economically from polyvinyl alcohol, it is necessary to employ thermoforming techniques such as injection molding at temperatures sufficient to thermoplasticize the polyvinyl alcohol. It is known that plasticized polyvinyl alcohol may be thermoformed or melt-extruded at high temperature. Unfortunately, when such thermoforming of polyvinyl alcohol has been tried in the past, it was found that while it was possible to produce suitable structures, the resulting product suffered from discoloration accompanied by a long-lived strong vinegary odor associated with acetic acid.

There are several explanations for this phenomenon.

Polyvinyl alcohol is obtained by the partial hydrolysis of polyvinyl acetate. Polyvinyl alcohols having a percent hydrolysis in the range of 74 to about 98 are generally cold-water soluble and therefore would be suitable for disposable products. However, when such a compound is subjected to high temperature it tends to degrade as indicated in the following formulas. Polyvinyl alcohol, for example, responds to heat treatment as indicated below:

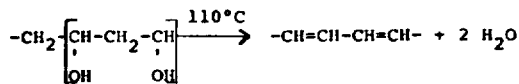

Small amount of intensely colored conjugated diene.

For a further discussion of this reaction see: Duncalf, B. and Dunn, A.S., "The Crosslinking of Polyvinyl Alcohol Films on Heating," *Symposium on Advances in Polymer Science and Technology*, London 1966, pp. 162–176.

Polyvinyl acetate responds to heat treatment as indicated below:

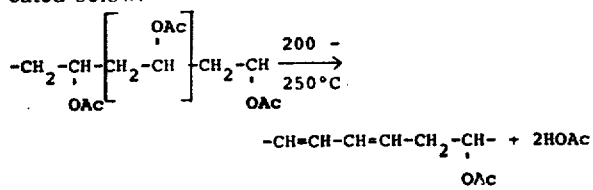

Generation of highly colored conjugated diene and acetic acid.

For a further discussion of this reaction see: Grassie, N., "Thermal Degradation Of Polyvinyl Acetate," Part 2, *Trans Faraday Soc.*, 49, No. 7, p. 836 July, 1953.

Other end products are aldehydes, ketenes, and carbon dioxide which may generate additional odors.

R. K. Tubbs, in an article entitled, "Melting Point and Heat of Fusion of Poly (vinyl Alcohol)," *Journal of Polymer Science: Part A*, Volume 3, pp 4,181–4,189 (1965), indicates that the degradation can be minimized by the proper choice of a plasticizer which increases the flow rate and lowers operating temperature. However, the vinegar or acetic acid odor remains very powerful. The presence of this odor is enough to preclude the use of water-soluble polyvinyl alcohol for injection-molded or thermoformed products especially if they are intended for personal or hospital use.

The object of this invention is to provide water-soluble polyvinyl alcohol which has been heat-degraded by injection molding and the like, and which remains substantially free of undesirable odor after such degradation.

SUMMARY OF THE INVENTION

The invention comprises adding a proton acceptor to water-soluble polyvinyl alcohol before subjecting the polyvinyl alcohol to the heat degradation caused by thermoforming, such as injection molding and the like. A proton acceptor, broadly defined, comprises a chemical possessing electronegative properties such that hydrogen bonding, quaternization, or neutralization with formation of water takes place. Such a proton acceptor suitable for use in this invention has a pH in the range of about 7.5 to 12.0. Suitable proton acceptors include both inorganic and organic compounds such as zinc oxide, calcium carbonate, sodium bicarbonate, disodium monohydrogen phosphate, polyvinylpyridine, polyvinyl pyrrolidone and many others. These proton acceptors may be used either alone or in combination.

The addition of a plasticizer such as glycerin, and a pigment such as titanium dioxide, improve handling and final physical characteristics. A preferred procedure is to mix the proton acceptor, plasticizer, pigment and powdered polyvinyl alcohol in a ribbon blender; extrude a rod comprising the mixture; chop the rod into pellets suitable for injection molding; and finally injection mold or otherwise thermoform the pellets into the desired final product. After exposure to air and achievement of moisture equilibrium the finished thermoformed product is substantially odor free. Both the extrusion step to form rods and the injection molding step to form an end product are usually carried out at temperatures of from 155° to 220°C. It is in this thermoforming temperature range that the above-described undesirable degradation of the polyvinyl alcohol occurs, and the benefits of this invention are therefore especially applicable.

DESCRIPTION OF PREFERRED EMBODIMENTS

The following specific examples are given to more clearly illustrate the invention.

EXAMPLE I 100 parts of polyvinyl alcohol powder having a percent hydrolysis of about 88 are mixed in a ribbon blender with 10 parts by weight of glycerin as a plasticizer. The mixture is extruded at about 200°C to form a rod, and the rod chopped into pellets suitable for injection molding. The pellets are then injection molded at about 200°C in a die used to form a tampon inserter tube. The tube thus formed is discolored and exudes a strong vinegary odor. The odor persists even after extended exposure to the atmosphere, and the product is therefore undesirable for its intended use.

EXAMPLE II 100 parts of 88 percent hydrolyzed polyvinyl alcohol are mixed in a ribbon blender with 10 parts by weight of glycerin as a plasticizer, 5 parts by weight of disodium monohydrogen phosphate as a proton acceptor, and 5 parts by weight of titanium dioxide as a pigment. The mixture is formed into pellets and injection molded in the same manner as in Example I. The resulting tampon inserter tube product is off-white in color and when first formed gives off a slight vinegary odor. After a short exposure to the atmosphere, when moisture equilibrium is achieved, the vinegary odor completely disappears. After extended exposure the odor does not return. When dropped in water the tubes rapidly soften and, when stirred with a glass rod, dissolve completely after a short time.

EXAMPLE III

This is the same as Example II except that 5 parts of zinc oxide are substituted for the disodium monohydrogen phosphate as the proton acceptor. The resulting tubes have substantially the same characteristics as the tubes described in Example II.

EXAMPLE IV

This is the same as Example II, except that 5 parts of sodium bicarbonate are substituted for the disodium monohydrogen phosphate as the proton acceptor. The resulting tubes are similar to those obtained in Examples II and III except that the structure may sometimes appear somewhat porous. This is attributed to the probability that the bicarbonate in the ephemeral presence of water of hydration gives off some carbon dioxide when heat is applied during the thermoforming.

EXAMPLE V

A mixture similar to Example II is again used except that polyvinyl pyrrollidone is employed as the proton acceptor in place of the disodium monohydrogen phosphate. An odorless tube off-white in color is again obtained, and the tube readily dissolves in water.

In the N. Grassie article referred to earlier, there appears to be a logical explanation for the vinegary odor which results in Example I. As Grassie describes it, when polyvinyl acetates are subjected to a thermomolding process the high temperature causes a breakdown of the acetate ester resulting in scission from the polymer backbone. Such scission also removes a proton with it, creating an olefinic link in the polymer along with free acetic acid which gives the odor of vinegar. The acetic acid is distributed throughout the structure so that even if the surface odor is dispersed, fresh acetic acid will migrate to the surface and the odor will be persistent.

When a proton acceptor such as those listed above is present in the structure, some free acetic acid is still generated by the heat used in molding. However, because polyvinyl alcohol is hygroscopic, it is theorized that soon after thermoforming and exposure to the ambient atmosphere, the polyvinyl alcohol picks up moisture to equilibrium and some ionization takes place to activate the proton donor. The proton acceptor thereby is free to associate with and neutralize any acetic acid which has been generated by the heat from the molding process, and which may be on the surface of the molded product or which is later released as the surface erodes.

While the use of a proton acceptor adequately takes care of the odor problem there is still some discoloration of the polyvinyl alcohol attributed to the high temperatures needed for injection molding. For that reason it is often desirable to incorporate a masking pigment, as is done by including titanium dioxide in the above examples, in order to provide a product which is aesthetically pleasing. The pigment may also be one which has proton accepting capabilities. If color masking is not required in a finished product, the use of a pigment may be omitted, of course. Other well known fillers and pigments may be used as long as they do not interfere with the thermoforming or injection molding.

Some type of plasticizer is desirable in order to assure smooth flow of the polyvinyl alcohol during injection molding and to maintain flexibility in the finished product. Accordingly, when utilizing injection molding as in the preferred embodiment, or when extruding, a plasticizer is always used. While glycerin is listed as the plasticizer in each of the examples, other compatible plasticizers may be used. Typical of such plasticizers in addition to glycerin are 1.3 butanediol, ethylene glycol, diethylene glycol, triethylene glycol and the like.

In the specific examples, it will be noted that in each instance only 5 parts by weight of a proton acceptor is used. The amount necessary depends of course on the amount of free acetic acid generated. The amount of free acetic acid may vary depending upon the molding temperature employed and the degree of degradation. The amount of proton acceptor may easily be adjusted upward or downward to take care of this variance, but 5 parts by weight has been found generally satisfactory. While injection molding is emphasized in the example this invention may also be used to advantage in other thermoforming procedures such as film extrusion and the like.

What is claimed is:

1. An improvement in the structure of thermoformed cold-water-soluble polyvinyl alcohol which has a percent hydrolysis in the range of 74 to about 98 and which structure has been heat-degraded by such thermoforming to the extent that some free acetic acid is produced in the thermoformed polyvinyl alcohol and is distributed throughout said thermoformed structure, said improvement consisting of the incorporation throughout said structure before heat degradation of a proton acceptor, said proton acceptor being such that it has a pH in the range of about 7.5 to 12.0 when said proton acceptor is activated and ionized by the pick-up of moisture normally present in the ambient atmosphere, said proton acceptor being present in said structure in an amount sufficient to react with and to neutralize any of said acetic acid which is also ionized when said structure is exposed to the moisture normally present in the ambient atmosphere, said proton acceptor being present in an amount of up to about 5 parts by weight of said polyvinyl alcohol structure thereby providing a heat-degraded polyvinyl alcohol structure which remains substantially free of the odor of said acetic acid.

2. The polyvinyl alcohol structure of claim 1 wherein said proton acceptor is selected from the group consisting of zinc oxide, calcium carbonate, sodium bicarbonate, disodium monohydrogen phosphate, polyvinylpyridine, polyvinyl pyrrolidone, alone or in combination.

3. The polyvinyl alcohol structure of claim 1 wherein said structure also contains a compatible plasticizer.

4. The polyvinyl alcohol structure of claim 3 wherein said structure also contains a color masking filler.

* * * * *